United States Patent

Hamby, Jr.

[11] Patent Number: 6,070,627
[45] Date of Patent: Jun. 6, 2000

[54] TREE DELIMBING DEVICE

[76] Inventor: Thomas E. Hamby, Jr., Rte. 1, Box 27A, Purlear, N.C. 28665

[21] Appl. No.: 09/273,654

[22] Filed: Mar. 23, 1999

Related U.S. Application Data

[63] Continuation-in-part of application No. 09/013,158, Jan. 26, 1998, Pat. No. 5,887,635.
[51] Int. Cl.$^7$ ............................... B27L 1/00; A01G 23/00
[52] U.S. Cl. ...................... 144/343; 144/24.13; 144/335
[58] Field of Search .................................. 144/24.13, 4.1, 144/335, 336, 337, 338, 343

[56] References Cited

U.S. PATENT DOCUMENTS 5,465,770  11/1995  Lansberry.
5,465,771  11/1995  Lansberry.

*Primary Examiner*—W. Donald Bray
*Attorney, Agent, or Firm*—Alston & Bird LLP

[57] ABSTRACT

A device for delimbing trees includes two pairs of opposing curved limb-stripping levers including curved cutting blades for engaging and encircling the trunk of a tree to remove limbs therefrom, and a bottom cutting blade positioned to remove limbs from a lower portion of the tree. The bottom cutting blade is movably mounted so as to move in response to forces imposed on the bottom cutting blade by a tree being pulled through the device. In one embodiment, the bottom cutting blade is vertically movable and is biased upward by a spring device. In another embodiment, the bottom cutting blade is pivotally mounted so as to be pivotable forward and rearward, and an impact tool is arranged to periodically transmit impact forces to the bottom cutting blade in a forward direction so as to drive the blade through a limb.

27 Claims, 6 Drawing Sheets

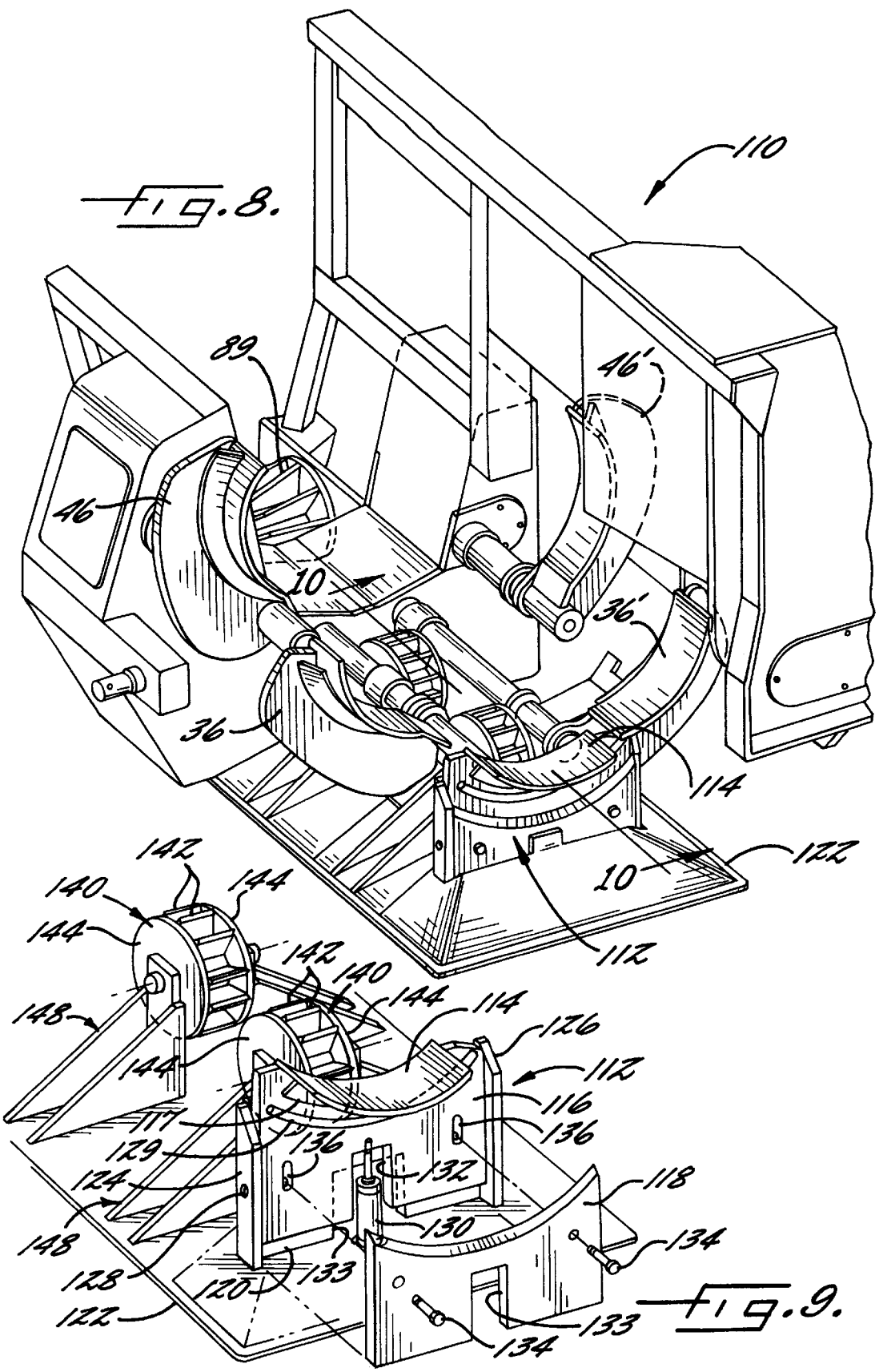

TREE DELIMBING DEVICE

CROSS-REFERENCE TO RELATED APPLICATION

The present application is a continuation-in-part of commonly owned U.S. patent application Ser. No. 09/013,158, filed Jan. 26, 1998, now U.S. Pat. No. 5,887,635.

FIELD OF THE INVENTION

The present invention relates to a device for delimbing felled trees and, more particularly, to a device having a device including two independently movable pairs of limb-stripping levers which are pivotable for engaging the bole of a tree being drawn longitudinally through the device.

BACKGROUND OF THE INVENTION

It is known to remove limbs from trees by encircling the tree trunk or bole with curved cutting blades and either moving the curved blades along the length of the tree, or pulling the tree longitudinally through the curved blades. My prior U.S. Pat. Nos. 4,749,012, 4,899,794, and 5,515,895, each of which is incorporated in its entirety herein by reference, describe self-aligning limb-stripping devices for delimbing trees in which curved cutting and limb stripping levers having cutting blades are carried by a rectangular support frame supported for pivotal movement in both vertical and horizontal planes so that the limb stripping blades are automatically maintained in proper alignment with respect to the longitudinal axis of the tree as the tree is drawn longitudinally through the device in a generally horizontal orientation. A pair of curved limb stripping levers having curved cutting blades are spaced about the longitudinal axis of the device and are pivotable toward and away from each other for engaging and disengaging a tree bole. The limb stripping levers and blades are positioned and configured to substantially encircle a tree bole disposed in the device, except for the bottom portion of the tree bole for which a fixed bottom cutting blade is provided for removing limbs therefrom.

The delimbing devices disclosed in the aforementioned patents are relatively inexpensive to manufacture and maintain, and are highly effective and efficient for removing limbs from trees having a bole diameter of up to about 14 inches. However, in certain applications, trees having bole diameters of up to about 24 inches must be delimbed. For these larger trees, the curved limb stripping levers and cutting blades are not capable of encircling the uppermost portions of the tree bole and, consequently, limbs on these uppermost portions are not removed by the device.

To handle such larger trees effectively and efficiently, I have developed an improved delimbing device described in my co-pending U.S. patent application Ser. No. 09/013,158 entitled "Tree Delimbing Device" and filed Jan. 26, 1998. The delimbing apparatus described in the '158 patent application employs two pairs of curved limb-stripping levers and a fixed bottom cutting blade for removing limbs from a lower portion of the trunk. The two pairs of limb-stripping levers work in tandem to strip limbs from the top and upper side portions and from the upper side portions and lower side portions of the tree, and are pivotable to accommodate a wide range of tree diameters. The device is highly effective at stripping limbs from trees having trunk diameters of from about 4 inches up to at least about 26 inches. It has been found, however, that particularly when the bottom cutting blade encounters a limb that joins the trunk at a knot having a large diameter, the bottom cutting blade tends to cut the limb off at the base of the knot closest to the trunk. This cutting path through the limb can be substantially longer than the axial distance through the limb a short distance outward of the trunk. Consequently, the bottom cutting blade must cut through a greater limb thickness than it would have to if it were able to cut the limb a short distance outward of the trunk. This effect is particularly disadvantageous because when the butt end of the tree is grasped in the grappler of a knuckle boom loader and placed into the device, the largest limbs of the tree tend to cause the tree to rotate so that the largest limbs are at the bottom of the tree. Thus, the largest cutting distances tend to be experienced by the fixed bottom cutting blade. In some cases, this can result in damage to the bottom cutting blade.

Furthermore, when a crooked tree is pulled through the limb-stripping device, in some cases the bottom cutting blade can dig into a crooked portion of the trunk and thus impede free movement of the tree through the device. Crooked trees can also result in large forces being imposed on the bottom cutting blade, which can damage the blade.

SUMMARY OF THE INVENTION

The present invention overcomes the above-noted drawbacks associated with my prior limb-stripping devices by providing a limb-stripping device having a generally rectangular support frame which supports at least one pair of curved limb-stripping levers that are pivotally supported for movement toward and away from each other, and a bottom cutting blade mounted to the support frame and positioned to remove limbs from a lower portion of a tree being pulled through the device, the bottom cutting blade being arranged to support at least a portion of the weight of a tree and being movably mounted to the support frame so as to move in response to forces imposed by a tree on the bottom cutting blade.

In accordance with one preferred embodiment of the invention, the bottom cutting blade is mounted so as to move downward in response to forces imposed by a tree generally downward on the bottom cutting blade. The bottom cutting blade is thus able to deflect downwardly so as to allow knots or other protruding portions of a tree to pass smoothly over the blade. Additionally, the movable cutting blade is less prone to being damaged by large forces imposed on the blade by large limbs and/or crooked portions of a trunk, because the blade tends to yield or give way in response to the forces rather than digging in.

Preferably, the bottom cutting blade is biased toward an upper position by a spring device. Various types of spring devices can be used, including a fluid-operated spring device such as a hydraulic cylinder.

The bottom cutting blade preferably includes a curved cutting blade affixed to a blade plate, and the device preferably includes track members defining a vertical track within which the blade plate is slidably disposed such that the bottom cutting blade structure is vertically movable relative to the support frame. Advantageously, a blocking member is attached to the blade plate below the curved cutting blade, the blocking member being configured to block passage of debris into a gap between the blade plate and a forward one of the track members.

In a preferred embodiment of the invention, the track members comprise a forward plate and a rearward plate oriented generally vertically and spaced apart along the longitudinal axis of the limb-stripping device so as to define the track within which the blade plate slides. The blocking member is attached to the blade plate above an upper edge of the forward plate. Advantageously, the blocking member comprises a rod affixed to and extending transversely along the blade plate generally parallel to the curved cutting blade.

In accordance with another preferred embodiment of the invention, the bottom cutting blade structure includes a curved primary cutting blade attached to an upper end of the blade plate, and a secondary cutting blade attached to the blade plate and spaced below the primary cutting blade. The secondary cutting blade has a forward cutting edge preferably located rearward of a forward cutting edge of the primary cutting blade. The secondary cutting blade assists in turning cut portions of a limb downwardly away from the primary cutting blade and cutting those portions off so that pieces of the tree cut by the bottom cutting blade structure do not interfere with other structure of the limb-stripping device below the cutting blade.

In some preferred embodiments of the invention, the limb-stripping device includes at least one roller rotatably mounted in the support frame downstream of the bottom cutting blade structure to facilitate sliding a tree through the device supported in part by the roller. The roller preferably is mounted such that an uppermost surface of the roller on which the tree rests is at the same vertical level as the bottom cutting blade structure when the bottom cutting blade structure is in the upper position. Still more preferably, the device includes a pair of rollers rotatably mounted in the support frame to facilitate sliding a tree through the device.

In accordance with an alternative embodiment of the invention, the bottom cutting blade is movable forward and rearward rather than up and down. More specifically, the blade is mounted so as to be pivotable about an axis that extends transverse to the longitudinal axis of the device and is located vertically lower than the bottom cutting blade such that the bottom cutting blade is pivotable in a forward and rearward direction. The limb-stripping device in this embodiment further includes a device operable to urge the bottom cutting blade forward against rearward forces imposed on the bottom cutting blade by a tree being pulled through the device.

Advantageously, the device for urging the bottom cutting blade forward comprises an impact tool operable to periodically transmit impact forces in a forward direction to the bottom cutting blade structure. Thus, as the tree is drawn through the device, the tree tends to pivot the bottom cutting blade in a rearward direction, but the impact tool continually impacts the bottom cutting blade structure in a forward direction so as to drive the bottom cutting blade forward through a limb being stripped from the tree.

BRIEF DESCRIPTION OF THE DRAWINGS

Other objects and advantages will become apparent from the following description taken in conjunction with the accompanying drawings in which:

FIG. 8 is a perspective view of yet another embodiment of the invention having a movably mounted bottom cutting blade and a pair of rollers proximate the curved limb-stripping levers;

FIG. 9 is a perspective view of a partial assembly of the device of FIG. 8, showing in greater detail the structure for movably mounting the bottom cutting blade;

DETAILED DESCRIPTION OF THE DRAWINGS

Figure 1:
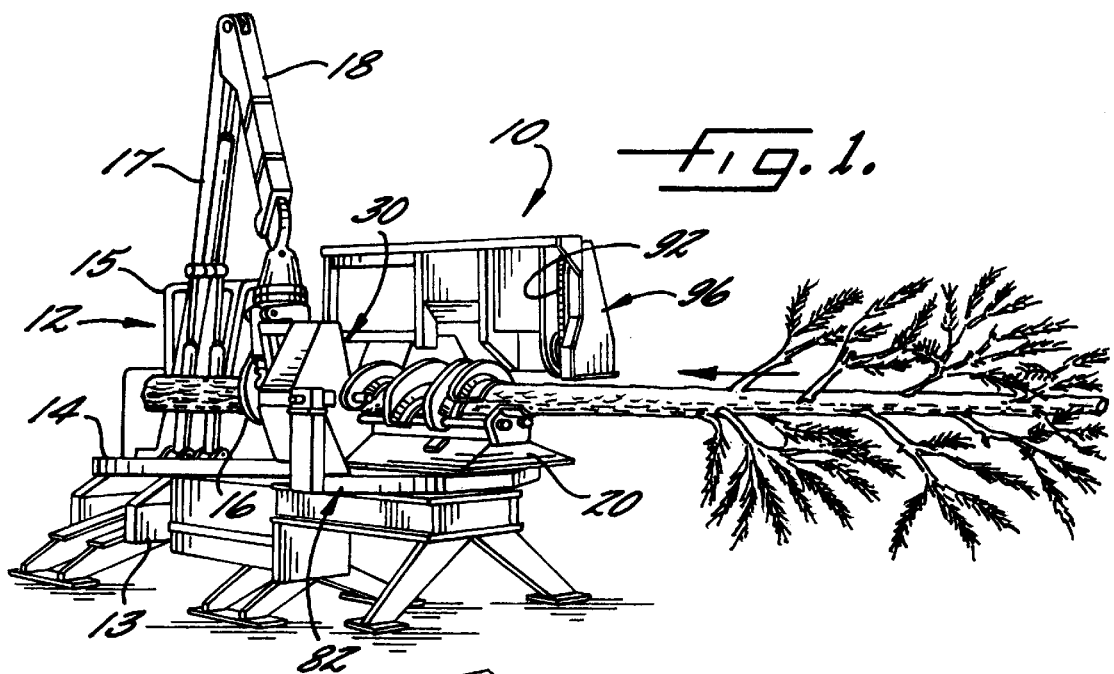
FIG. 1 is a perspective view of the device supported on one end of a knuckle boom loader and showing a tree trunk being pulled through the device by the grapple of the knuckle boom loader.
Figure 2:
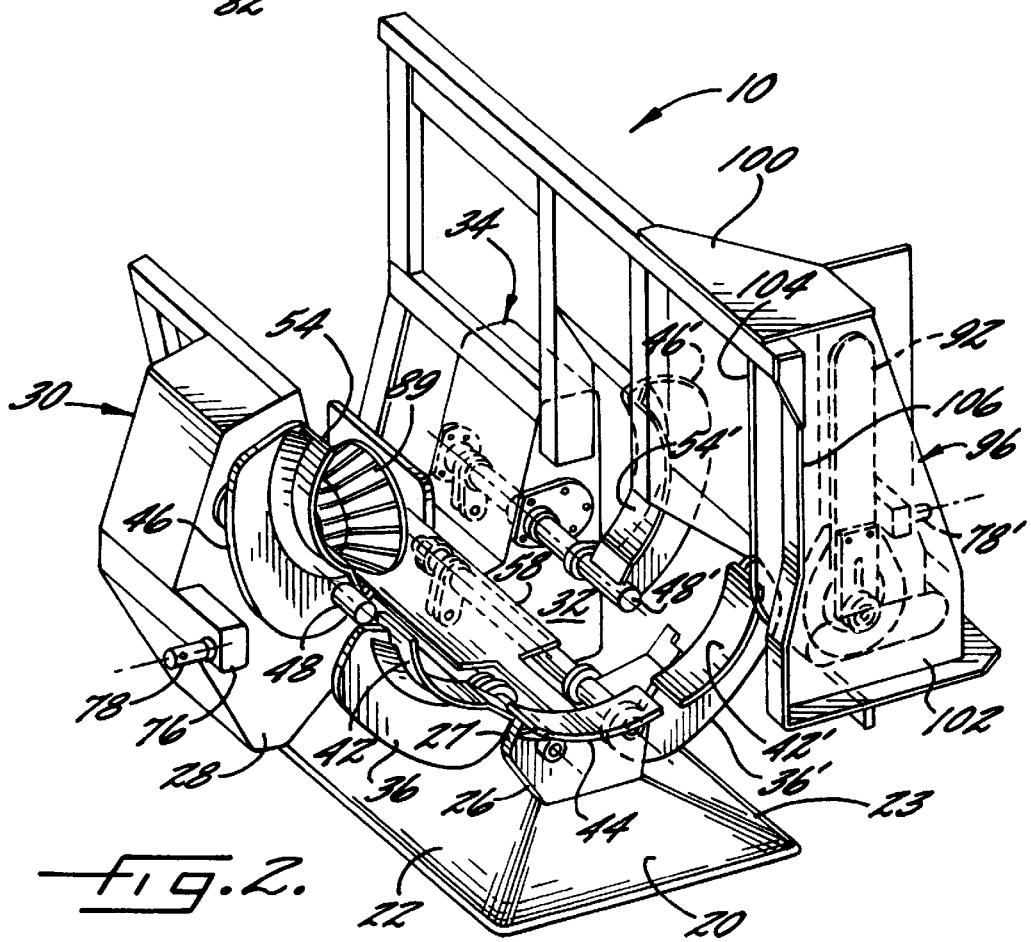
FIG. 2 is a perspective view of the device in isolation, showing the curved limb-stripping levers in open positions in preparation for receiving the bole of a tree.

With reference to FIG. 1, a limb-stripping device 10 in accordance with a first preferred embodiment of the invention is shown supported on an extension of a knuckle boom loader 12. The knuckle boom loader 12 may be of any suitable type and includes a lower frame 13 supporting a pivotal platform 14 on which is mounted a suitable operator enclosure 15 and a boom having crane arms 17, 18 supporting a grapple 16 on the free end thereof. The crane arms 17, 18 and the grapple 16 are operated in conventional manner by means of hydraulic cylinders (not shown).

The knuckle boom loader 12 is typically used for picking up felled trees which have already been delimbed either to cut them into shorter lengths and place them on a truck for transportation or to place them on a truck in their full lengths without cutting them into shorter lengths. The trees are normally skidded or dragged from the forest and stacked adjacent the knuckle boom loader 12, after having had the limbs cut therefrom in the woods by a hand chain saw operation. However, by providing the device 10 on the knuckle boom loader 12, this time-consuming hand chain saw operation is avoided. Instead, the felled trees can be stacked next to the knuckle boom loader 12 before having their limbs removed, and the knuckle boom loader operator can carry out the delimbing operation in an efficient and economical manner by simply drawing a tree through the device 10 after the tree is lifted from a stack of felled trees to be loaded onto the truck. The delimbed tree can then either be cut into shorter lengths and loaded onto the truck, or loaded onto the truck without further cutting.

With reference to FIGS. 2–6, the device 10 is of the same type as described in my earlier U.S. Pat. Nos. 4,749,012, 4,899,794, and 5,515,895, and includes a rectangular support frame having a rearwardly inclined front end wall 20, opposite inwardly inclined side walls 22 and 23, and a top plate 24. A front bearing plate 26 is affixed to the support frame and extends vertically upwardly therefrom adjacent the juncture between the front end wall 20 and the top plate 24. A left rear bearing plate 28 is affixed to the support frame and extends vertically upwardly therefrom adjacent a rear edge of the left side wall 22, the left rear bearing plate 28 forming a front wall of a left-side enclosure 30 for housing a pair of actuators, as further described below. A right rear bearing plate 32 is affixed to the support frame and extends vertically upwardly therefrom adjacent a rear edge of the right side wall 23, the right rear bearing plate 32 forming a front wall of a right-side enclosure 34 for housing a second pair of actuators, as further described below.

A first pair of curved cutting and limb-stripping levers 36, 36' is supported adjacent the front end wall 20 by a pair of horizontal longitudinally extending support shafts 38, 38' which are parallel to a longitudinal axis of the device defining a feed direction for a tree through the device. Left support shaft 38 has a front end supported in a bearing in front bearing plate 26 and a rear end supported in a bearing in left rear bearing plate 28. Right support shaft 38' has a front end supported in a bearing in front bearing plate 26 and a rear end supported in a bearing in right rear bearing plate 32. Sleeved over the support shafts 38, 38' are left and right rotatable support tubes 40 and 40', respectively, which are rotatable about the respective support shafts 38, 38'. The curved limb-stripping levers 36, 36' are secured to the rotatable support tubes 40, 40', respectively, for rotation therewith. Thus, rotation of the support tubes 40, 40' in one direction or the other causes the limb-stripping levers 36, 36' to be rotated toward or away from each other, as can be seen by comparing FIG. 4 which shows the levers in open positions in preparation for receiving a tree bole, with FIGS. 5 and 6 which show the levers in various closed positions engaging tree boles of various diameters.

Figure 6:
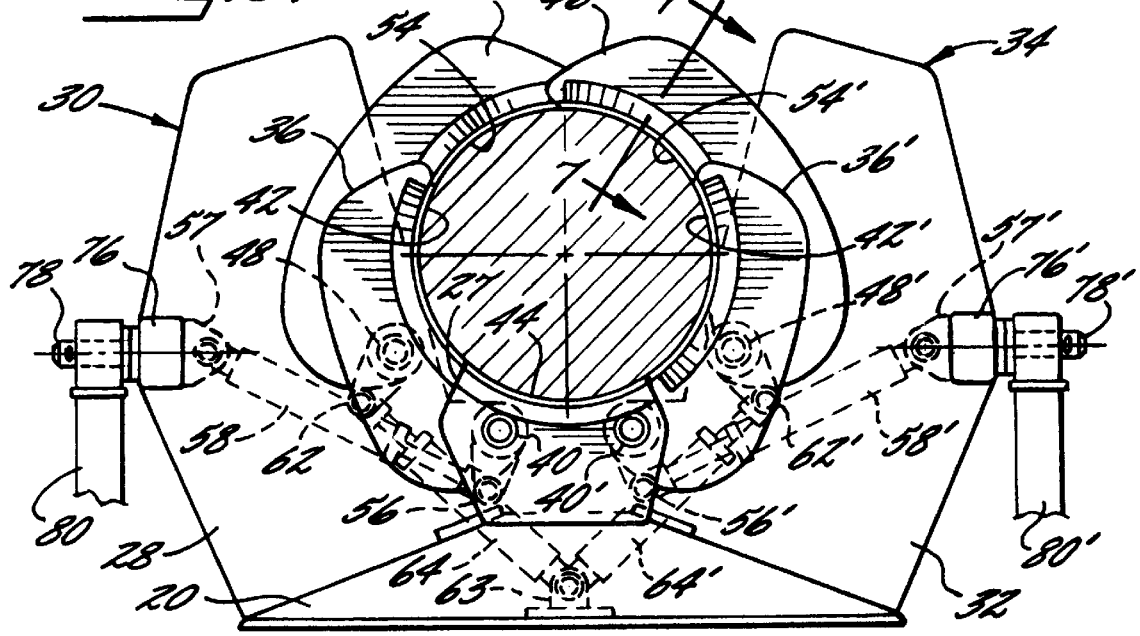
FIG. 6 is a front elevational view similar to FIG. 5, showing the limb-stripping levers engaging a tree bole of a predetermined maximum diameter, the first (forward) pair of levers engaging opposite side and lower portions of the tree bole and the second (rearward) pair of levers engaging opposite side and upper portions of the tree bole.

The limb-stripping levers 36, 36' have respective curved cutting blades 42, 42' fixed to their inner curved surfaces and extending generally longitudinally forward thereof, and collectively define a tree-encircling cutting opening therebetween for longitudinal movement of a tree trunk in one direction through the cutting opening, as illustrated in FIG. 1. The limb-stripping levers 36, 36' and cutting blades 42, 42' are positioned and configured to encircle opposite side and lower portions of a tree bole of a predetermined maximum diameter. Advantageously, the limb-stripping levers 36, 36' and cutting blades 42, 42' are positioned and configured for removing limbs from opposite side and lower portions of a tree bole having a diameter of up to about 24 inches, as illustrated in FIG. 6 which depicts a tree bole of the predetermined maximum diameter disposed within the device. Additionally, a stationary lower cutting blade 44 is affixed to the front bearing plate 26 for engaging a bottom portion of the tree for removing limbs therefrom which would otherwise not be removed by the limb-stripping levers 36, 36'.

The device 10 includes a second pair of curved limb-stripping levers 46 and 46' supported downstream of the first pair of limb-stripping levers 36, 36'. The second limb-stripping levers 46, 46' are mounted on rotatable support tubes 48, 48', respectively, each of which is supported by a pair of bearings. Left support tube 48 is supported at its rear end by a bearing 50 secured to a rear wall (not shown, but indicated by phantom line 51 in FIG. 4) of the left-side enclosure 30, and is supported partway along its length by a bearing 52 secured to the left rear bearing plate 28. The support tube 48 extends forwardly from the left rear bearing plate 28, and limb-stripping lever 46 is attached to this forwardly extending portion of support tube 48.

Similarly, right support tube 48' is supported at its rear end by a bearing 50' secured to a rear wall (not shown, but indicated by phantom line 51 in FIG. 4) of the right-side enclosure 34, and is supported partway along its length by a bearing 52' secured to the right rear bearing plate 32. The support tube 48' extends forwardly from the right rear bearing plate 32, and limb-stripping lever 46' is attached to this forwardly extending portion of support tube 48'.

The second limb-stripping levers 46, 46' have respective curved cutting blades 54, 54' fixed to their inner curved surfaces and extending generally longitudinally forward thereof. The limb-stripping levers 46, 46' and cutting blades 54, 54' are positioned and configured to engage opposite side and upper portions of a tree bole of the predetermined maximum diameter, preferably about 24 inches as previously noted, as illustrated in FIG. 6. To this end, the support tubes 48, 48' are spaced horizontally outward of and vertically above the support tubes 40, 40' of the first pair of limb-stripping levers 36, 36'. The second pair of limb-stripping levers 46, 46', further define, together with the first pair of limb-stripping levers 36, 36', a tree-encircling opening for longitudinal movement of a tree trunk through the device 10, as illustrated in FIG. 1.

Figure 4:
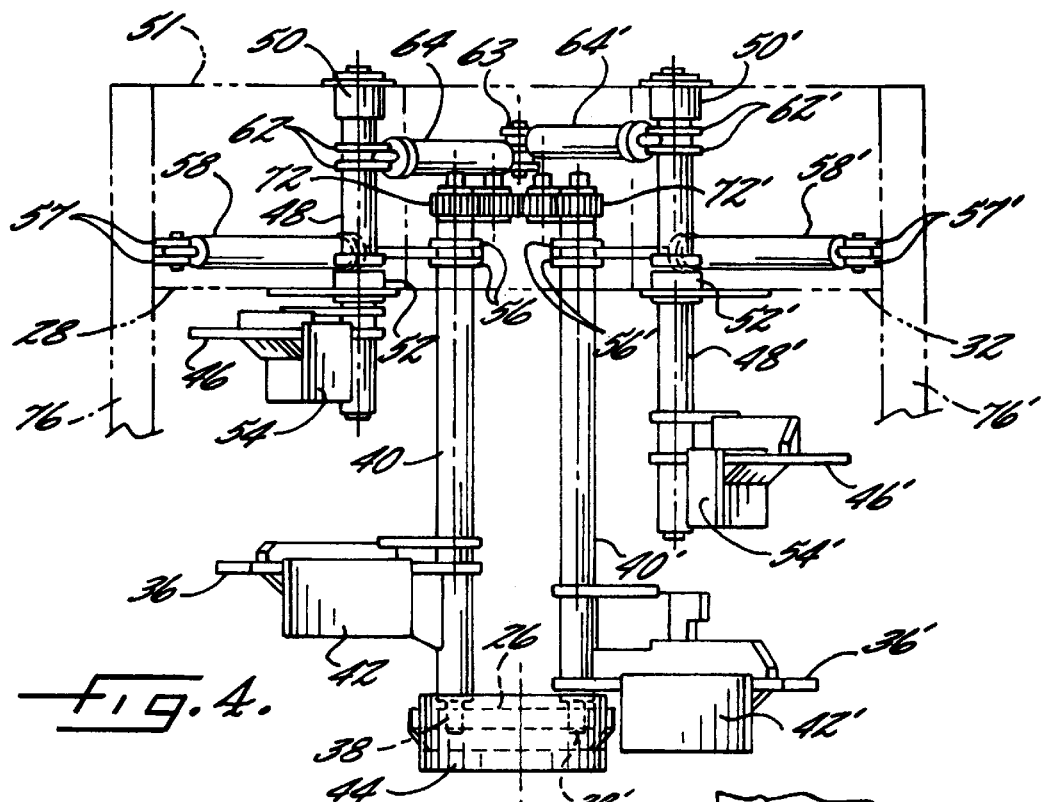
FIG. 4 is a fragmentary top elevational view of the device, showing the mounting of the limb-stripping levers on rotational drive tubes and support shafts.
Figure 3:
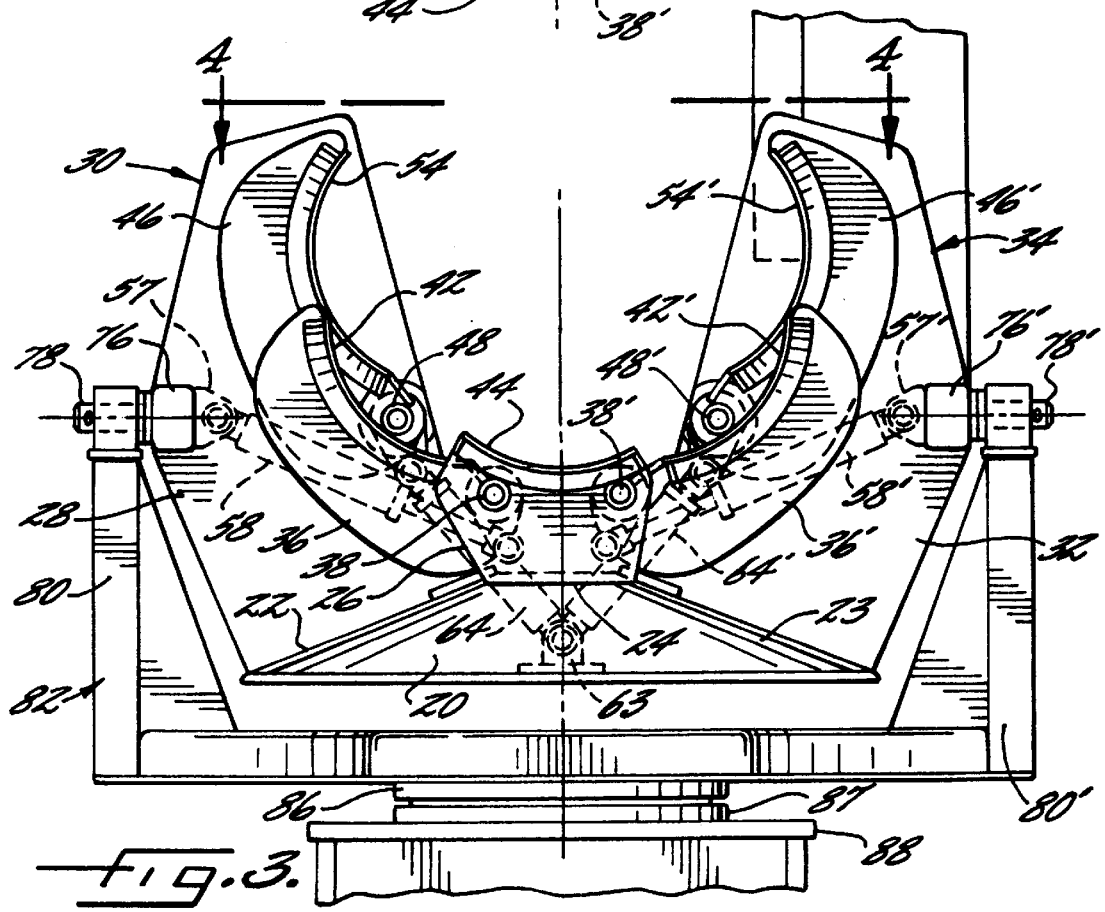
FIG. 3 is a front elevational view of the device with the limb-stripping levers in the open positions.

The limb-stripping levers 36, 36' and 46, 46' are opened and closed by a plurality of hydraulic cylinders. With reference to FIGS. 3, 4, and 6, support tubes 40, 40' each includes a pair of longitudinally spaced-apart depending crank arms 56, 56', respectively, located between the left and right enclosures 30 and 34 and beneath a cover plate 58 which extends longitudinally through the device 10 and shields the support tubes 40, 40' from being contacted by the tree trunk as it is pulled through the device. The lower ends of the crank arms 56 are pivotally attached to the rod ends of a pair of hydraulic cylinders 58, 58'. The cylinder ends of hydraulic cylinders 58, 58' are pivotally attached via brackets 57, 57' to a pair of support brackets 76, 76' which provide attachment points for supporting the device, as further described below. Retraction of the piston rods of hydraulic cylinders 58, 58' causes the levers 36, 36' to close toward each other and engage a tree positioned in the device. The hydraulic cylinders 58, 58' are each configured with two chambers separated from each other by a piston or ram attached to the piston rod. The chamber adjacent the rod end is coupled via a supply line (not shown) to a suitable supply of pressurized hydraulic fluid, and the chamber adjacent the cylinder end is coupled via a return line to an accumulator (not shown) having a compressible gas spring. Opening a supply valve (not shown), which may be located at the knuckle boom loader 12 for operation by the knuckle boom loader operator, causes hydraulic fluid to be supplied to the rod-end chambers of the hydraulic cylinders 58, 58' so that the piston rods are retracted, thus causing the first pair of levers 36, 36' to be closed. Hydraulic fluid in the cylinder-end chambers of the hydraulic cylinders 58, 58' is forced by the retracting pistons into the accumulator, causing the gas spring to be compressed. Thus, upon closing of the supply valve, the pressure is relieved in the rod-end chambers, and the gas spring expands and causes fluid to be pumped into the cylinder-end chambers to re-extend the piston rods and thereby open the levers 36, 36'.

The device 10 includes means for insuring that the limb-stripping levers 36 and 36' open and close in synchronism with each other. Specifically, the rotatable support tubes 40, 40' have respective timing gears 72, 72' coaxially attached adjacent their downstream ends for rotation therewith. A pair of idler spur gears 74, 74' are connected between the timing gears 72 and 72', the timing gear 72, idler spur gear 74, idler spur gear 74', and timing gear 72' thus forming a gear train which prevents non-uniform inward and outward movement of the limb-stripping levers 36, 36'.

The second pair of levers 46, 46' are opened and closed by a second pair of hydraulic cylinders 64, 64'. The cylinder ends of the hydraulic cylinders 64, 64' are pivotally attached to a common bracket 63 attached to the support frame at the longitudinal centerline of the device and extend upwardly and outwardly therefrom. The rotatable support tubes 48, 48' which support the second pair of levers have depending crank arms 62, 62'. The rod ends of the hydraulic cylinders 64, 64' are pivotally attached to the crank arms 62, 62'. The hydraulic cylinders 64, 64' are coupled to the pressurized fluid supply and the accumulator in opposite fashion from the hydraulic cylinders 56, 56', such that operating the supply valve to supply additional hydraulic fluid to the hydraulic cylinders 64, 64' causes the piston rods to extend rather than retract. Extension of the piston rods of hydraulic cylinders 64, 64' causes the second pair of levers 46, 46' to close. The levers 46, 46' are opened when the supply valve is operated to shut off hydraulic pressure to the cylinders 64, 64', via action of the accumulator as previously described.

A flow control valve (not shown) controls the opening and closing speed of the second levers 46, 46'. Preferably, the second levers 46, 46' are closed after the first levers 36, 36' have closed, and are opened after the first levers 36, 36' have opened. By closing first, the first levers 36, 36' align the device so that its longitudinal axis is along the longitudinal axis of the tree, as further described below.

The device 10 includes features permitting the device to pivot in both the vertical and horizontal planes so that it is self-aligning with the tree bole's longitudinal axis. The features permitting vertical and horizontal pivoting are substantially as disclosed in my prior U.S. Pat. No. 4,899,794, the entire disclosure of which is incorporated herein by reference. Thus, the left enclosure 30 includes a bracket 76 which supports an outwardly extending horizontal pivot pin 78, and likewise the right enclosure 34 includes a bracket 76' with an outwardly extending horizontal pivot pin 78'. The pivot pins 78, 78' are supported in the upper ends of upstanding vertical legs 80, 80', of a support yoke 82 which includes a horizontal medial portion in the form of a plate 84 extending horizontally beneath the rectangular support frame of the device. Thus, the rectangular support frame is cradled for swinging or pivotal movement in the vertical plane between the opposite vertical legs 80, 80' of the support yoke 82. It is preferred that the pivot pins 78, 78' be located slightly rearward of the center of gravity of the device 10 so that the rectangular support frame tilts down at the front end when the device is not in use.

The horizontal plate 84 is attached to an upper plate 86 of a slew or swivel ring, and the upper plate 86 is supported in the usual manner by ball bearings on a lower plate 87 of the slew or swivel ring. The lower plate 87 is fixed on a base support plate 88 which, in turn, may be fixed on an extension of a knuckle boom loader such as shown in FIG. 1, or which, alternatively, may be fixed on a trailer or other transportable vehicle to permit the device 10 to be readily moved from one site to another. Thus, the plates 86, 87 of the slew or swivel ring provide a pivotal connection for movement of the rectangular support frame in a horizontal plane.

In operation of the device, the operator of the knuckle boom loader 12 picks up a tree to be delimbed via the grapple 16, which engages the butt end portion of the tree bole. The fluid supply valve is in the closed position so that the hydraulic cylinders 58, 58' and 64, 64' position the limb-stripping levers in the open positions as shown in FIG. 3. The tree is lifted to a position above the level of the device 10 and the butt end is then lowered into position in engagement with the curved stationary cutting blade 44 and between the open limb-stripping levers 36, 36' and 46, 46', as illustrated in cross-section in FIG. 6.

When the butt end portion of the tree bole is positioned in the device 10, the device will pivot in both the vertical and horizontal planes so as to automatically become aligned with the longitudinal axis of the tree. The operator then operates the supply valve to supply hydraulic fluid to the hydraulic cylinders 58, 58' and 64, 64' so that the first levers 36, 36' rotate inwardly in a uniform synchronous manner on opposite sides of the tree trunk to encircle and resiliently engage the outer surface of the trunk. Any slight misalignment of the device with the trunk is corrected by engagement of the first levers 36, 36' with the trunk. Further in this regard, the front bearing plate 26 has an inwardly inclined edge surface 27 (FIG. 6) extending upwardly toward the fixed lower cutting blade 44 so that should the trunk be brought into engagement with the inclined edge surface 27, the closing of the first lever 36 will cause the trunk to ride up the inclined surface 27 and onto the bottom blade 44, thus preventing the trunk from becoming lodged between the first lever 36 and the front bearing plate 26. The second levers 46, 46' then close about the trunk. The knuckle boom loader operator then draws the tree through the device 10 by moving the grapple 16 away from the device. As the tree trunk moves through the device, the curved blades 42, 42', 54, 54', and 44 engage and strip any outwardly extending limbs from the tree trunk, and the device pivots on its mount to stay aligned with the tree trunk. A ridged or webbed hourglass-shaped roller 89 mounted for rotation about its longitudinal axis is located downstream of levers 46, 46' and helps to maintain the tree trunk centered in the device 10 as the trunk rides over the roller 89.

Figure 7:
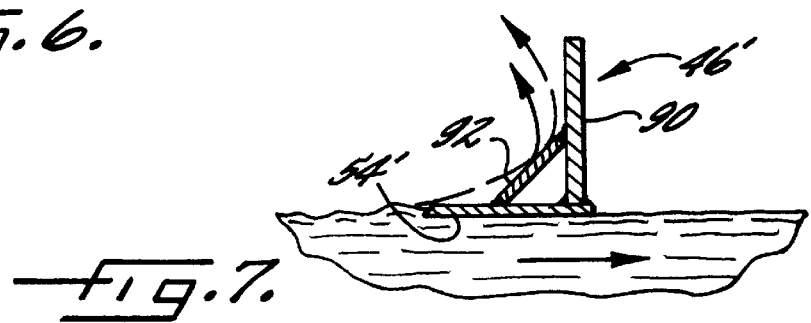
FIG. 7 is a cross-sectional view taken on line 7—7 of FIG. 6, illustrating one of the bevel plates for deflecting cut pieces outwardly and away from the cutting blade.

The limb-stripping levers 36, 36' and 46, 46' include angled deflecting members for deflecting cut pieces of the tree outwardly away from the cutting blades 42, 42' and 54, 54'. Specifically, with reference to FIG. 7 depicting a cross-section through the limb-stripping lever 46' which is representative of the construction of all of the limb-stripping levers, each limb-stripping lever includes a transversely extending portion 90 to which the curved cutting blade, for example 54', is attached at a curved inner edge of the transversely extending portion 90. The cutting blade 54' extends generally longitudinally forward of the transversely extending portion 90, such that an angle of approximately 90° is formed at the juncture therebetween. The limb-stripping lever 46' includes an angled deflecting member in the form of a bevel plate 92 which is connected between the transversely extending portion 90 and the cutting blade 54', the bevel plate in any generally radial plane such as the one indicated by line 7—7 of FIG. 6 forming an angle of about 45° to about 60° relative to the cutting blade 54'. As indicated by arrows 94 in FIG. 7, the bevel plate 92 deflects cut pieces of the tree outwardly away from the cutting blade 54', and particularly prevents cut pieces from becoming jammed in the corner of the juncture between the blade and the transversely extending portion of the limb-stripping lever.

Figure 5:
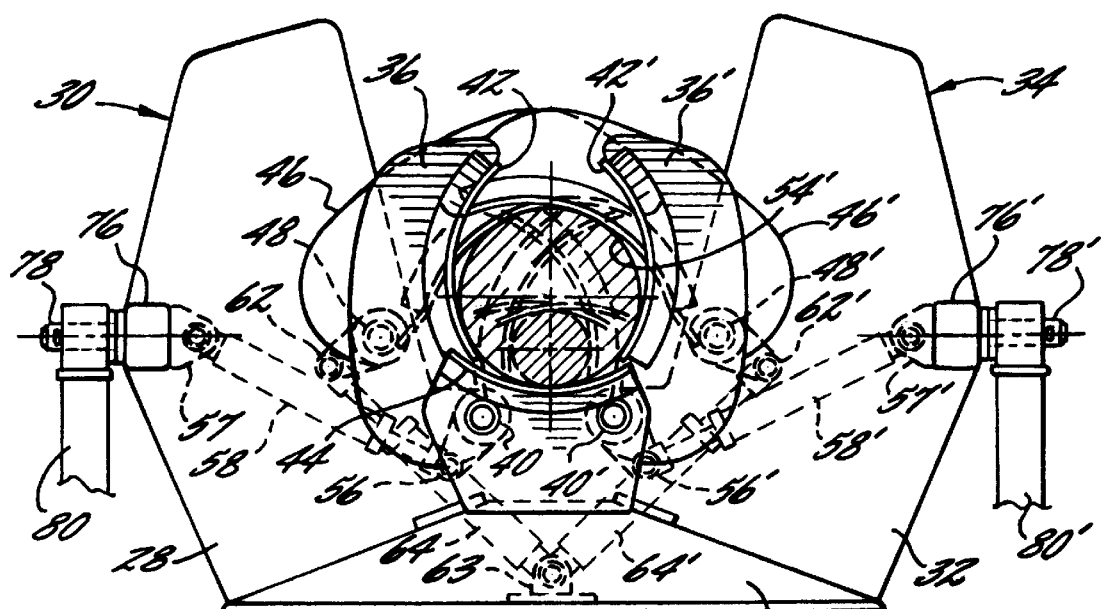
FIG. 5 is front elevational view of the device showing the limb-stripping levers engaging a tree bole of a first larger diameter disposed in the assembly, and showing in phantom lines the limb-stripping levers engaging a tree bole of a second smaller diameter.

As illustrated in dashed lines in FIG. 5, the limb-stripping levers 36, 36' and 46, 46' are initially moved in and resiliently held in encircling relationship with the full-size tree trunk adjacent its butt end. As the tree trunk is drawn through the device 10 and the limbs are stripped therefrom from the butt end to the top end, the diameter of the trunk gradually diminishes and the curved cutting and limb-stripping levers are moved inwardly and resiliently maintained in engagement with the trunk by continuous application of hydraulic pressure to the hydraulic cylinders until the tree trunk is reduced to a diameter of about 3–4 inches, as illustrated by the small dashed line circle of FIG. 5. If the trunk is crooked, the second levers 46, 46' move independently of each other to remain engaged with the trunk and to permit the trunk to pass through the device.

The device 10 includes a saw box 96 which houses a pivotally movable saw 98 for engaging the small-diameter top portion of the trunk to remove the top portion of the tree. The saw box 96 includes a housing 100 having a vertical front guard plate 102 and a vertical rear guard plate 104 spaced from and parallel thereto. The saw 98 is supported between the front and rear guard plates 102, 104 so as to be pivotable about a longitudinally extending horizontal axis at a lower end of the saw 98. The saw box 96 is located adjacent the forward edge of the rectangular support frame of the device to position the saw 98 for engaging and removing the small-diameter top portion of a tree which has been drawn through and is still engaged in the cutting opening of the device.

In order to prevent limbs from pressing against and interfering with the saw box 96 and the pivotal movement of the saw 98, a forwardly extending cutting blade 106 is affixed to the front guard plate 102 of the saw box housing 100 adjacent an inner edge of the guard plate 102, the cutting blade 106 extending along a substantial portion of the vertical inner edge of the guard plate 102. As a tree is drawn through the device, any limbs which are drawn over the cutting blade 106 are cut off at that point so that the portions of the limbs which extended outwardly beyond the cutting blade location are removed to prevent their interfering with the saw box.

As previously noted, it has been found that when the bottom cutting blade 44 encounters a limb that joins the trunk at a knot having a large diameter, the bottom cutting blade 44 in some cases tends to cut the limb off at the base of the knot closest to the trunk, which represents a longer cutting distance than would be experienced a short distance outward of the trunk. FIGS. 8–12 depict an alternative embodiment of the invention having a bottom cutting blade structure that tends to overcome this problem so that the limb is cut off a slight distance outward of the trunk. The limb-stripping device 110 is similar in many respects to the device 10 previously described, and thus the present description primarily focuses on those aspects of the device 110 that are different.

The device 110 includes a bottom cutting blade structure 112 mounted upstream of the first pair of limb-stripping levers 36, 36'. The bottom cutting blade structure 112 includes a curved cutting blade 114 affixed at an upper edge of a blade plate 116 such that the cutting blade 114 extends generally normal to the blade plate 116. The cutting blade advantageously also includes a bevel plate 117 affixed at an angle at the juncture between the cutting blade 114 and the blade plate 116 for reinforcing the attachment of the blade and for the purposes previously described in connection with the bevel plate 92 shown in FIG. 7. The bottom cutting blade 114 is thus positioned to strip limbs from a lower portion of a tree. It will also be understood that a portion of the weight of a tree is supported on the bottom cutting blade 114 as the tree is pulled through the device 110.

Figure 10:
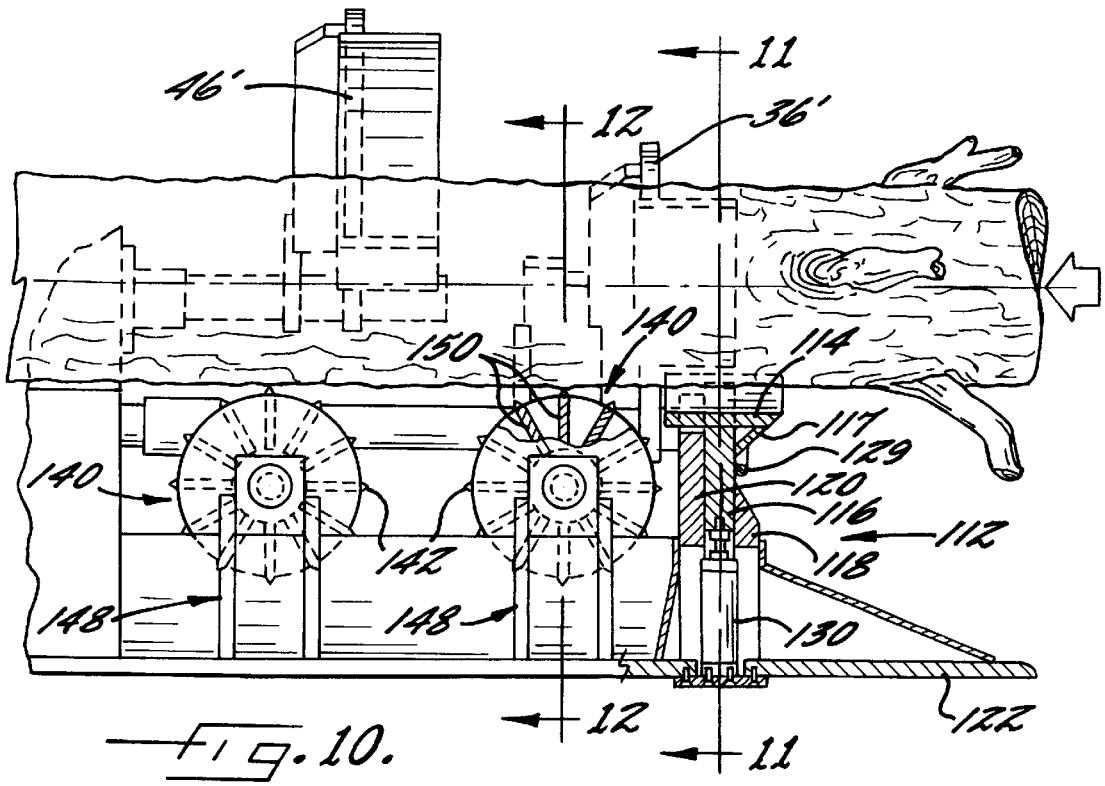
FIG. 10 is a cross-sectional view taken on line 10—10 of FIG. 8, showing a tree positioned in the device in preparation for being pulled through the device.
Figure 11:
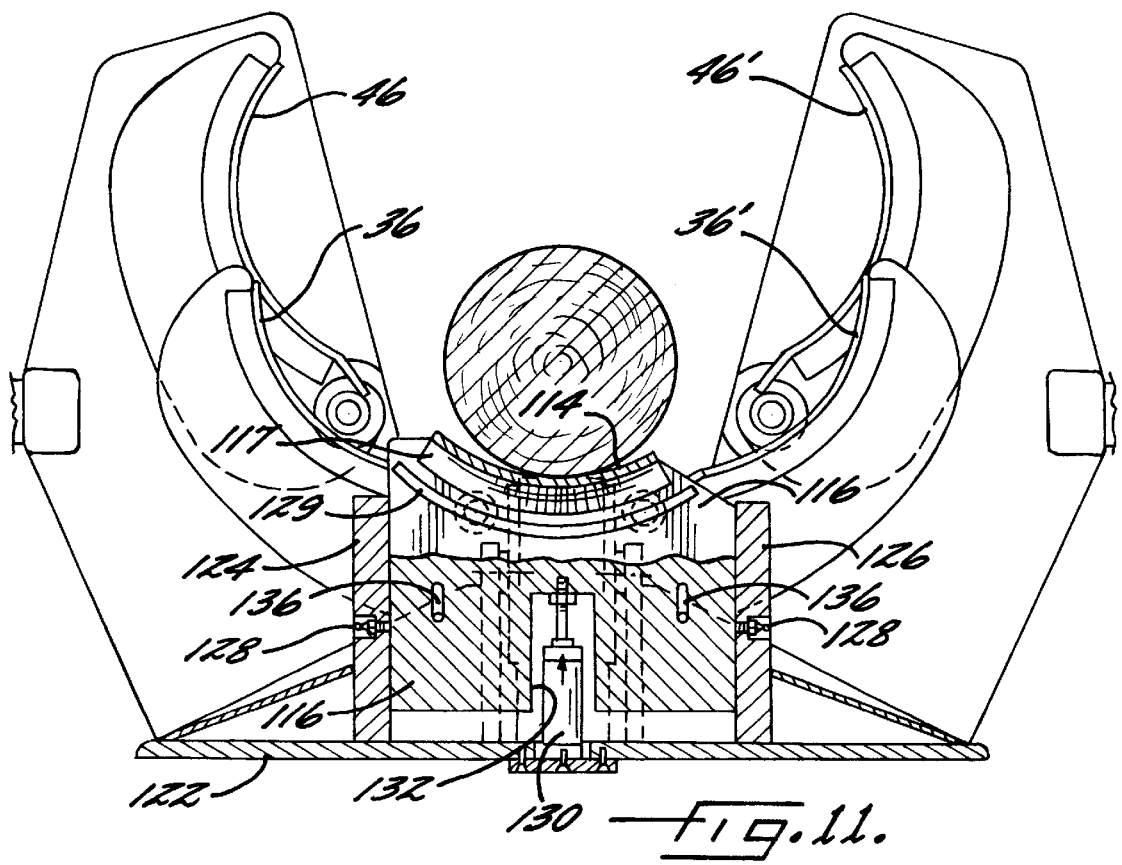
FIG. 11 is a cross-sectional view taken on line 11—11 of FIG. 10.
Figure 12:
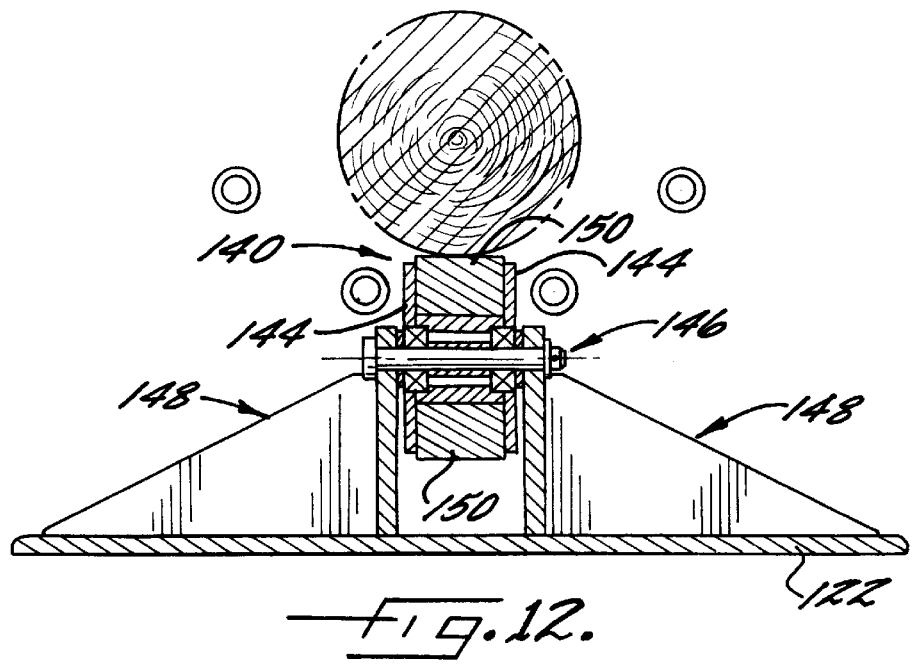
FIG. 12 is a cross-sectional view taken on line 12—12 of FIG. 10.

The bottom cutting blade structure further includes track members defining a track within which the blade plate vertically slides. More particularly, the track members preferably include a forward plate 118 and a rearward plate 120 that are fixedly mounted in vertical orientation on a bottom support member 122 of the support frame of the device and are spaced apart in a longitudinal direction by a distance slightly exceeding a thickness of the blade plate 116 such that the blade plate freely slides in the space between the plates 118 and 120, as best seen in FIGS. 9 and 10. The track so defined between the plates 118 and 120 is covered at its two opposite side edges by a pair of side members 124 and 126 affixed to the support member 122 and to the plates 118 and 120. Grease fittings 128 advantageously are provided in the side members 124 and 126 for lubricating the sliding surfaces of the blade plate 116. Thus, the blade plate 116 with the cutting blade 114 attached thereto is vertically movable relative to the support frame of the device. A blocking member in the form of a rod 129 is attached to the blade plate 116 below the cutting blade 114 and above the upper edge of the forward plate 118 in order to block debris from entering the gap between the forward plate 118 and the blade plate 116.

The device 110 preferably includes a spring device 130 operable to exert an upward biasing force on the blade plate 116 so as to urge the blade plate 116 and cutting blade 114 into an upper position. The spring device 130 advantageously comprises a fluid-operated spring device, such as a hydraulic or pneumatic cylinder. The spring device 130 in the illustrated embodiment is disposed generally between the forward and rearward plates 118 and 120 within a recess or cut-out 132 defined in a lower edge of the blade plate 116. Where the longitudinal dimension of the spring device 130 measured along the axis of the limb-stripping device 110 exceeds the thickness of the blade plate 116, as shown, the forward and rearward plates 118 and 120 can also include recesses 133. A lower end of the spring device 130 is connected to the support member 122 and the upper end of the spring device engages the blade plate 116 and applies a force thereto in an upward direction. The upward movement of the blade plate 116 is limited by a pair of bolts 134 extending axially between and connecting the forward and rearward plates 118 and 120 and passing through a pair of vertically elongate slots 136 formed in the blade plate 116. Accordingly, when the downward force on the cutting blade 114 is less than the biasing force exerted by the spring device 130, the spring device 130 will move the blade plate 116 and cutting blade 114 into an upper position wherein the bolts 134 contact the lower ends of the elongate slots 136 as shown in FIG. 9. Conversely, when the total downward force exerted on the cutting blade 114 exceeds the biasing force exerted by the spring device 130, the cutting blade 114 and blade plate 116 will be moved downward.

The spring device 130 preferably is operable to exert an increasingly greater upward force on the blade plate 116 as it is compressed by downward movement of the blade plate and cutting blade. The spring device 130 preferably is operable to exert a force on the blade plate 116 that significantly exceeds the force exerted by each of the limb-stripping levers 36, 36' and 46, 46' on the tree. For example, where each of the limb-stripping levers exerts a force of about 700 pounds on the tree in steady state (i.e., non-dynamic) operation, the spring device 130 advantageously exerts a force of about 1400 pounds on the blade plate 116 when the blade plate is in the upper position. It will be appreciated, of course, that the biasing force for each of the limb-stripping levers and the spring device 130 that is most advantageous in a given application will depend on a number of factors, including the overall size of the limb-stripping apparatus. The maximum vertical travel of the cutting blade 114 and blade plate 116 advantageously is about 0–2 inches, and more preferably about 1 inch.

The limb-stripping device 110 preferably also includes at least one, and more preferably two, rollers 140 rotatably mounted in the support frame of the device such that the rollers freely rotate about respective axes that extend transverse to the longitudinal axis of the device. The rollers 140 are positioned to support a trunk of a tree being pulled through the device 110 and to be rotated by the rearward movement of the tree so as to facilitate free movement of the tree. An upstream one of the rollers 140 preferably is mounted adjacent the forward limb-stripping levers 36, 36' and a downstream one of the rollers 140 is mounted adjacent the rearward limb-stripping levers 46, 46'.

Various types of rollers can be used. In the illustrated embodiment, each roller 140 is formed by a pair of circular end plates 144 that define central circular apertures through which an axle and bearing assembly 146 extends. The axle and bearing assembly 146 of each roller is rotatably mounted via a bracket structure 148 to the support member 122 of the support frame. A plurality of generally radially oriented plate-shaped petals or spokes 150 are spaced about the circumference of the roller and mounted between the end plates 144. Each roller 140 is preferably constructed to include projecting members 142 configured to dig into the tree to reduce slippage of the tree relative to the rollers. Any configuration of projecting members effective to reduce slippage between the tree and the rollers can suitably be used. In the illustrated embodiment, the projecting members 142 comprise wedge-shaped outer ends of the spokes 150 extending outward of the periphery of the end plates 144. Alternatively, the projecting members can be formed as bumps or points on the periphery of each end plate 144 and extending outward of the spokes 150.

The rollers 140 are preferably configured and positioned so that an uppermost surface of each roller that engages and supports the tree is at the same vertical level as an upper surface of the bottom cutting blade 114 when the cutting blade 114 is in its upper position. Accordingly, the tree is supported on the rollers 140 and rolls therealong as the tree is pulled through the device, and the bottom cutting blade 114 is positioned against the trunk. Downward movement of the tree as a whole is prevented by the rollers 140, but portions of the tree protruding below the upper surfaces of the rollers, such as limbs and/or crooked portions of the trunk, can cause the cutting blade 114 to be moved further downward against the biasing force of the spring device 130. For example, when the bottom cutting blade 114 encounters a downwardly protruding knot, the force exerted on the cutting blade 114 by the knot will tend to cause the cutting blade 114 to be depressed downwardly so that the knot can pass over the blade. As soon as the knot clears the blade 114, the blade is moved back up against the trunk by the spring device 130. Thus, instead of digging into the knot and possibly damaging the good wood in the trunk as a fixed bottom blade might do, the movable blade 114 allows the knot to ride over the blade and then springs back. When the blade 114 encounters a limb, it cuts through the limb adjacent to or close to the trunk. It will be understood that the bevel angle on the blade 114 can be adjusted to provide a smooth cut through limbs and the like.

Figure 13:
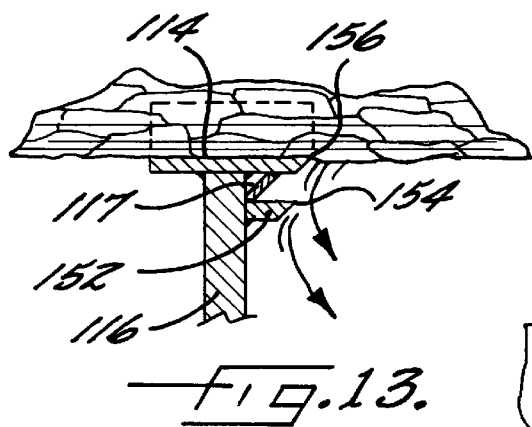
FIG. 13 is a sectioned side elevation of another preferred embodiment of a bottom cutting blade in accordance with the present invention.

Portions of the tree cut by the bottom cutting blade 114 in some cases can interfere with the structure of the device 110 below the blade 114. To help alleviate this situation, an alternative embodiment of the invention, shown in FIG. 13, includes a secondary cutting blade 152 affixed to the blade plate 116 and spaced below and parallel to the cutting blade 114. The forward cutting edge 154 of the secondary cutting blade 152 is located rearward of the forward cutting edge 156 of the primary cutting blade 114. The secondary cutting blade 152 helps turn cut pieces of the tree downward and cuts them off so that they do not interfere with the structure below the secondary cutting blade. The primary and secondary blades can be formed as a layered structure such that the secondary blade provides structural reinforcement to the primary blade.

Figure 14:
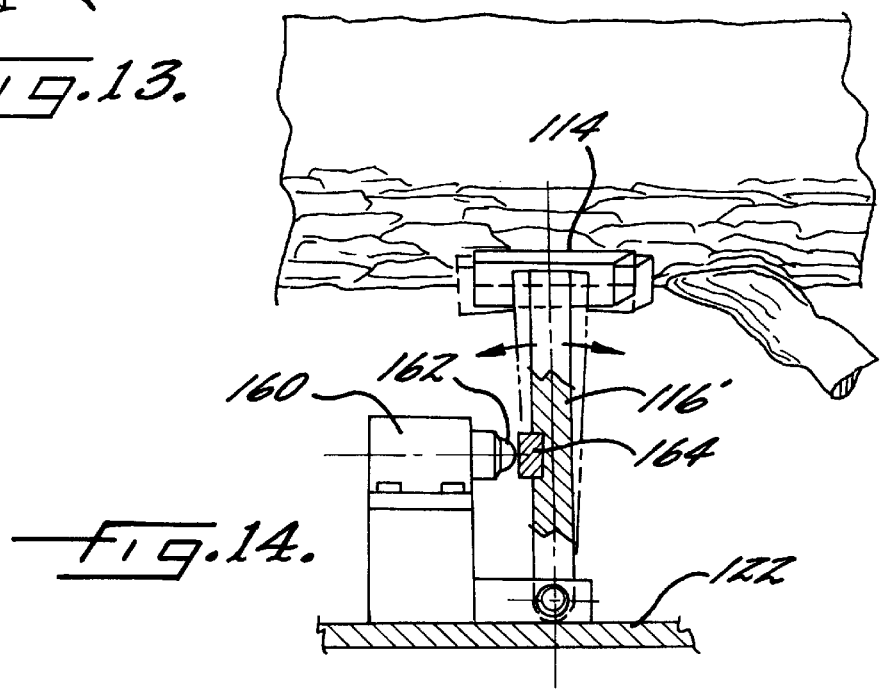
FIG. 14 is a side elevation, partly in section, of yet another embodiment of the present invention in which the bottom cutting blade is pivotable forward and rearward and is impacted by an impact tool in a forward direction so as to drive the bottom cutting blade through a limb.

A further alternative embodiment of the invention is depicted in FIG. 14. The limb-stripping device in accordance with this embodiment includes a blade plate 116' that is pivotally connected at its lower end to the support member 122 of the support frame such that the blade plate 116' pivots about an axis that extends transversely to the longitudinal axis of the limb-stripping device. Accordingly, as illustrated in phantom lines in FIG. 14, the cutting blade 114 affixed to the upper end of the blade plate 116' is movable forward and rearward by virtue of the pivotal motion of the blade plate 116'. An impact tool 160 is mounted in the support frame and includes a reciprocating member 162 arranged to engage a rear surface of the blade plate 116'. The impact tool 160 is operable to reciprocatingly move the member 162 so as to periodically impact the blade plate 116' in the forward direction. The blade plate 116' preferably includes a hardened portion or insert 164 for tolerating the impacts without substantial deformation. As a tree is pulled through the limb-stripping device and slides along the bottom cutting blade 114, the tree tends to pivot the blade plate 116' and the cutting blade 114 rearward, but the impact tool 160 impacts the blade plate 116' to drive it forward and cause the cutting blade 114 to cut part of the way through any limb encountered by the blade. Following a given impact, the motion of the tree will again cause the blade 114 to be moved rearward, but the succeeding impact will again drive the blade forward to cut further through the limb. Thus, the cutting blade 114 is periodically and continually driven forward to cut through limbs. The impact tool 160 preferably comprises a pneumatic impact tool such as an air hammer or the like. Suitable impact tools for use with the present invention are sold under the name Rammer Hammer.

It will be appreciated that the forward and rearward motion of the cutting blade 114 can be accomplished in various ways. The illustrated embodiment has the blade 114 attached to a pivotal blade plate 116', but alternatively the blade can be mounted on a structural member that translates forward and rearward, the important factor being that the blade be movable in forward and rearward directions.

In the drawings and specification there have been set forth particular and preferred embodiments of the invention, and these embodiment have been described in considerable detail and with the aid of specific terms. However, such specific terms are used in an illustrative and descriptive sense only, and the terms employed and the form and arrangement of features of the illustrated and described embodiments are not to be regarded as limiting the scope of the invention defined in the claims.

What is claimed is:

1. A device for delimbing trees, comprising:

a support frame;

at least one pair of curved limb-stripping levers supported by the support frame, each of the limb-stripping levers including a curved cutting blade fixed thereto, the limb-stripping levers being generally opposed to one another and pivotally supported for movement toward and away from each other for engaging a tree being pulled through the device; and a bottom cutting blade mounted to the support frame and positioned to remove limbs from a lower portion of a tree being pulled through the device, the bottom cutting blade being arranged to support at least a portion of the weight of a tree and being movably mounted to the support frame so as to move in response to forces imposed by a tree on the bottom cutting blade.

2. The device of claim 1, wherein the bottom cutting blade is mounted so as to move downward in response to forces imposed by a tree generally downward on the bottom cutting blade.

3. The device of claim 2, wherein the bottom cutting blade is biased toward an upper position by a spring device.

4. The device of claim 3, wherein the spring device comprises a fluid-operated spring device.

5. The device of claim 4, wherein the fluid-operated spring device comprises a hydraulic cylinder.

6. The device of claim 1, wherein the bottom cutting blade is mounted so as to be pivotable about an axis that extends transverse to the longitudinal axis of the device and is located vertically lower than the bottom cutting blade such that the bottom cutting blade is pivotable in a forward and rearward direction, and further comprising a device operable to urge the bottom cutting blade forward against rearward forces imposed on the bottom cutting blade by a tree being pulled through the device.

7. The device of claim 6, wherein the device for urging the bottom cutting blade forward comprises an impact tool operable to periodically transmit impact forces in a forward direction to the bottom cutting blade so as to drive the bottom cutting blade forward through a limb being stripped from a tree.

8. A device for delimbing trees, comprising:

a support frame;

first and second pairs of curved limb-stripping levers supported by the support frame, each of the limb-stripping levers including a curved cutting blade fixed thereto, the limb-stripping levers of each said pair being generally opposed to one another and pivotally supported for movement toward and away from each other for engaging a tree being pulled through the device, the first and second pairs of limb-stripping levers being spaced apart along a longitudinal axis of the device with the first pair of limb-stripping levers being proximate an upstream end of the device;

a bottom cutting blade structure mounted to the support frame and positioned to remove limbs from a lower portion of a tree being pulled through the device, the bottom cutting blade structure being mounted so as to be movable generally vertically; and a spring device in engagement with the bottom cutting blade structure and operable to exert a biasing force urging the bottom cutting blade structure toward an upper position and to permit the bottom cutting blade structure to move downward in response to downward forces imposed by a tree on the bottom cutting blade structure.

9. The device of claim 8, wherein the bottom cutting blade structure includes a curved cutting blade affixed to a blade plate, and further comprising track members defining a vertical track within which the blade plate is slidably disposed such that the bottom cutting blade structure is vertically movable relative to the support frame.

10. The device of claim 9, further comprising a blocking member attached to the blade plate below the curved cutting blade, the blocking member being configured to block passage of debris into a gap defined between the blade plate and a forward one of the track members.

11. The device of claim 10, wherein the track members comprise a forward plate and a rearward plate oriented generally vertically and spaced apart along the longitudinal axis so as to define the track within which the blade plate slides, and wherein the blocking member is attached to the blade plate such that the blocking member is above an upper edge of the forward plate.

12. The device of claim 11, wherein the blocking member comprises a rod having a length extending transversely along the blade plate generally parallel to the curved cutting blade.

13. The device of claim 9, further comprising a secondary cutting blade attached to the blade plate and spaced below the curved cutting blade, the secondary cutting blade having a forward cutting edge located rearward of a forward cutting edge of the curved cutting blade.

14. The device of claim 8, further comprising at least one roller rotatably mounted in the support frame downstream of the bottom cutting blade structure to facilitate sliding a tree through the device supported in part by the roller.

15. The device of claim 14, wherein the roller is mounted such that an uppermost surface of the roller is at a lower vertical level than the bottom cutting blade structure when the bottom cutting blade structure is in the upper position.

16. The device of claim 14, further comprising a pair of rollers rotatably mounted in the support frame downstream of the bottom cutting blade structure to facilitate sliding a tree through the device.

17. The device of claim 16, wherein at least a second one of the pair of rollers is positioned downstream of the first pair of curved limb-stripping levers.

18. The device of claim 16, further comprising a third roller rotatably supported in the support frame downstream of the first and second pairs of limb-stripping levers.

19. The device of claim 16, wherein at least one of the rollers includes projecting members configured to dig into a tree bole to reduce slippage of the roller with respect to the tree bole.

20. A device for delimbing trees, comprising:

a support frame;

first and second pairs of curved limb-stripping levers supported by the support frame, each of the limb-stripping levers including a curved cutting blade fixed thereto, the limb-stripping levers of each said pair being generally opposed to one another and pivotally supported for movement toward and away from each other for engaging a tree being pulled through the device, the first and second pairs of limb-stripping levers being spaced apart along a longitudinal axis of the device with the first pair of limb-stripping levers being proximate an upstream end of the device;

a bottom cutting blade mounted to the support frame proximate the upstream end of the device and positioned to remove limbs from a lower portion of a tree being pulled through the device, the bottom cutting blade being movably mounted relative to the support frame such that the bottom cutting blade is capable of moving rearward and forward while maintaining a forward cutting edge of the blade positioned for cutting a limb; and an impact tool supported in the support frame and operable to periodically transmit impact forces in a forward direction to the bottom cutting blade so as to drive the bottom cutting blade forward through a limb being stripped from a tree.

21. The device of claim 20, wherein the bottom cutting blade is pivotally mounted so as to be pivotable about a pivot axis that extends transverse to the longitudinal axis of the device and is spaced vertically lower than the bottom cutting blade.

22. The device of claim 21, wherein the bottom cutting blade is affixed to a generally vertical blade plate having a lower end spaced below the bottom cutting blade, the lower end of the blade plate being pivotally connected to the support frame.

23. The device of claim 22, wherein the impact tool is arranged to impact a rear surface)of the blade plate in a generally forward direction.

24. The device of claim 23, wherein the blade plate includes a hardened portion contacted by the impact tool.

25. The device of claim 20, wherein the impact tool comprises a pneumatic hammer.

26. A method of removing limbs from a tree, comprising:

pulling the tree butt-end-first through an opening defined between a plurality of curved cutting blades positioned to substantially encircle a trunk of the tree and operable to remove limbs therefrom, the curved cutting blades including a bottom cutting blade positioned to remove limbs from a lower portion of the trunk;

supporting at least a portion of the weight of the tree on the bottom cutting blade as the tree is pulled through the opening; and allowing the bottom cutting blade to move generally downward in response to weight and other forces imposed by the tree in a generally downward direction on the bottom cutting blade when a combined sum of the weight and other forces exceeds a threshold level.

27. The method of claim 26, further comprising exerting a biasing force on the bottom cutting blade in a generally upward direction, the bottom cutting blade moving downward when the combined sum of weight and other forces exceeds the biasing force.

* * * * *